United States Patent
Westerlund et al.

(10) Patent No.: US 7,419,628 B2
(45) Date of Patent: Sep. 2, 2008

(54) METHOD AND MOULDING TOOL FOR MANUFACTURING FIBRE-REINFORCED PRODUCTS

(75) Inventors: Ake Westerlund, Hemmingsmark (SE); Anders Jansson, Pitea (SE); Bengt Asplund, Pitea (SE)

(73) Assignee: ABB AB, Västerås (SE)

( * ) Notice: Subject to any disclaimer, the term of this patent is extended or adjusted under 35 U.S.C. 154(b) by 289 days.

(21) Appl. No.: 10/296,091

(22) PCT Filed: May 21, 2001

(86) PCT No.: PCT/SE01/01136

§ 371 (c)(1),
(2), (4) Date: Mar. 5, 2003

(87) PCT Pub. No.: WO01/96095

PCT Pub. Date: Dec. 20, 2001

(65) Prior Publication Data

US 2005/0161862 A1    Jul. 28, 2005

(30) Foreign Application Priority Data

Jun. 16, 2000    (SE) .................................... 0002256

(51) Int. Cl.
*B29C 43/18* (2006.01)
*B29C 43/54* (2006.01)
*B32B 27/04* (2006.01)
*B32B 27/12* (2006.01)

(52) U.S. Cl. .................. 264/272.15; 264/259; 264/278; 425/443

(58) Field of Classification Search ................. 264/257, 264/259, 263, 266, 271.1, 279.1, 272.11, 264/272.15, 273, 275, 277, 278, 279, 324; 425/129.1, 544, 443

See application file for complete search history.

(56) References Cited

U.S. PATENT DOCUMENTS

| 4,100,247 | A | | 7/1978 | Shead et al. |
| 4,110,278 | A | * | 8/1978 | Demmler et al. ............ 523/506 |
| 4,470,786 | A | | 9/1984 | Sano et al. |
| 5,118,458 | A | * | 6/1992 | Nishihara et al. ............ 264/155 |
| 5,827,548 | A | * | 10/1998 | Lavallee et al. ............. 425/116 |

FOREIGN PATENT DOCUMENTS

| EP | 0 342 237 A1 | 7/1988 |
| EP | 0 384 653 A2 | 2/1990 |

* cited by examiner

*Primary Examiner*—Matthew J. Daniels
(74) *Attorney, Agent, or Firm*—Dykema Gossett PLLC

(57) ABSTRACT

A method and apparatus for manufacturing fiber-reinforced products with integrated insert parts by moulding a heat-bonding resin having a viscosity of about 1-10_6 and about 30-10+6 mPas, between two joinable halves of a separable mould having an upper and lower mould parts forming a cavity therebetween, the inner moulding faces are attached to displaceable fixed parts of a pressing table. Prior to moulding, an insert part is fixed in position in the cavity, and the mould parts each have a set of a support devices displaceable in the cavity relative to the respective moulding faces. According to the method, the resin is located in the cavity before the mold is closes and the insert is in position prior to and during an initial phase of moulding. The support device is removed prior to the setting of the resin in the mould leaving holes in the material, and thereafter the mold parts are held together for filling the holes.

5 Claims, 4 Drawing Sheets

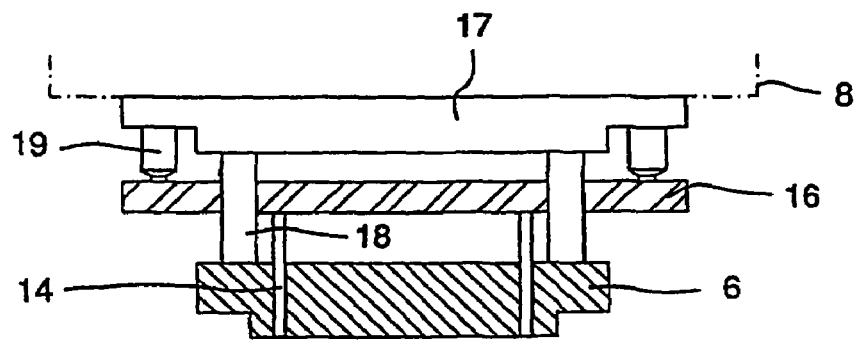
FIG.8
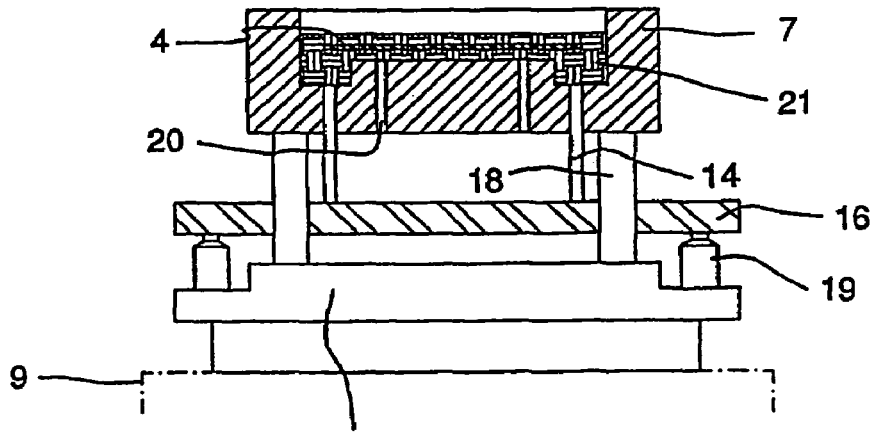
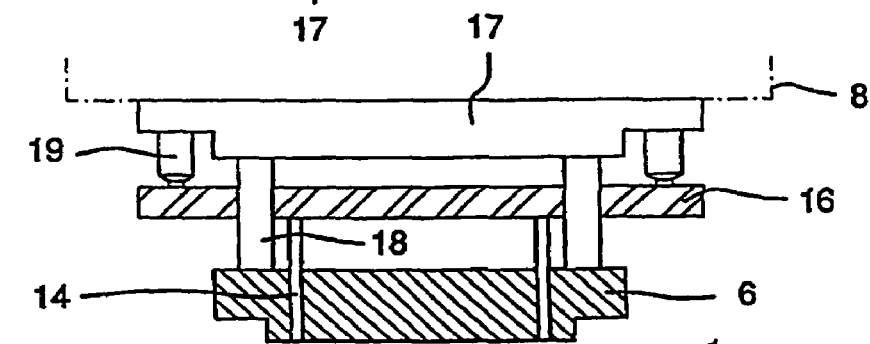
FIG.9
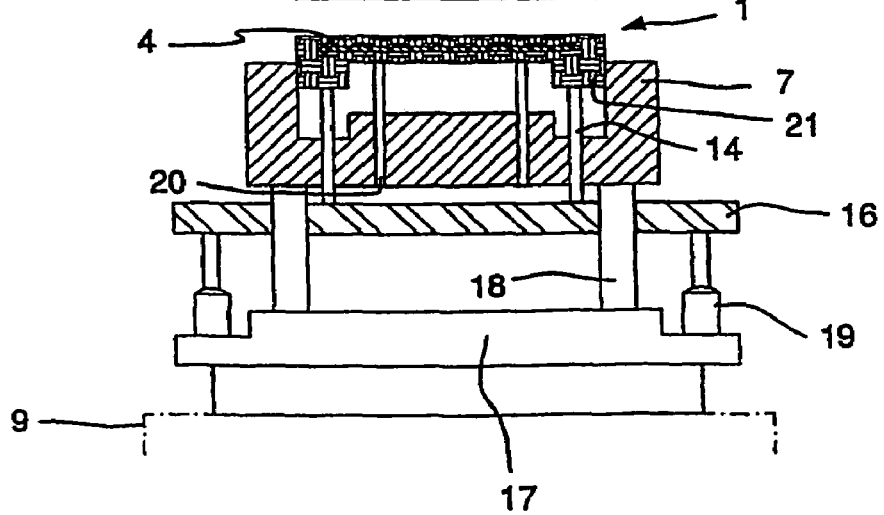

METHOD AND MOULDING TOOL FOR MANUFACTURING FIBRE-REINFORCED PRODUCTS

TECHNICAL AREA

The present invention relates to a method for manufacturing products of fibre-reinforced thermosetting plastic with integrated insert parts by moulding a heat-bonding resin between two joinable halves of a separable mould, whereby the insert part is fixed in position in the mould cavity that is demarcated between the two joinable halves of the mould prior to the moulding of the product. The invention also relates to a moulding tool for carrying out the method.

THE PRIOR ART

The manufacture of moulded goods where the starting material essentially comprises reinforced plastic material takes place through a predetermined amount of moulding material of a heat-bonding resin being pressed between two steel moulds at temperatures that commonly lie in the range 140-165° C. The moulding is commonly performed in hydraulic low pressure presses where the moulding pressure can be regarded as being relatively low and in general not exceeding 5-20 MPa per projected area of the moulded goods. The cavity is defined by the recessed faces of the two joinable mould halves in the form of an upper part and a lower part that are commonly made of machine tool steel and having carefully designed cutting or compression edges whose task is to seal the cavity and cut off any eventual excess material. The process cycle times of the compression moulding process depend on the properties of the chosen staring material and the design and complexity of the product in general, but can generally be regarded as relatively short and seldom exceeding 2 minutes. The moulding material that is used for the moulding commonly includes a type of material pre-impregnated with resin, for example, in the form of pre-impregnated fibre structure, so-called pre-pregs. The said pre-impregnated material is commonly designated "Sheet Moulding Compounds" and in the following is given the term SMC-material. In certain applications, there is a need to manufacture by compression moulding highly resistant products whereby specific details or so-called inserts are wholly or partially incorporated in and enclosed by the SMC-material. In particular, it has been shown to be desirable to be able to manufacture products of SMC-material with incorporated and essentially enclosed electrical or electronic components in the form of circuit boards or similar within them.

DESCRIPTION OF THE INVENTION

The aim of the present invention is to achieve a method that makes it possible to use compression moulding to manufacture details in which the inserts are incorporated in and essentially enclosed by the moulding material. In particular, it has been shown to be desirable to be able to manufacture products of SMC-material in which electronic components in the form of circuit boards or similar are incorporated in and essentially enclosed by the said SMC-material. Another aim of the invention is to achieve a moulding tool to perform the actual method.

These aims are achieved by the method and device according to this invention having the characteristics stated in the independent claims 1 and 5 and, more specifically, by the method according to the invention being in principle characterised in that during moulding, moulding halves each having a set of support devices are displaceable in a projecting manner relative to the moulding face associated with each moulding half, that the insert part is held in a fixed position between the said support devices prior to and during the initial phase of the moulding, that the supporting devices are removed from their position supporting the insert part before the resin sets in the mould, and in that the mould halves are further pressed together during the filling out of the holes left after the support devices, whereby the material that is used during the moulding is given a certain excess volume that is equivalent to the volume of the said holes.

DESCRIPTION OF THE FIGURES

In the following, the invention is described in greater detail with reference to the following drawings, in which:

FIGS. 4 to 9 show fragmented views, partly in cross-section, of the different steps of the manufacturing process according to the invention.

DESCRIPTION OF ONE EMBODIMENT

Figure 1:
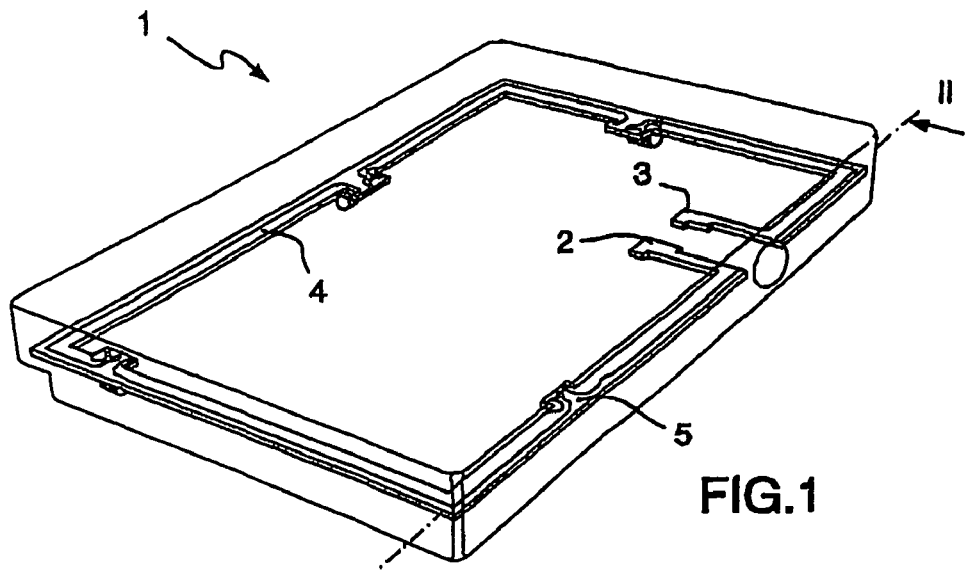
FIG. 1 shows in perspective view an x-ray image through a so called balis-plate, which is used as an example of one embodiment to describe the principle that forms the basis of the present invention.
Figure 2:
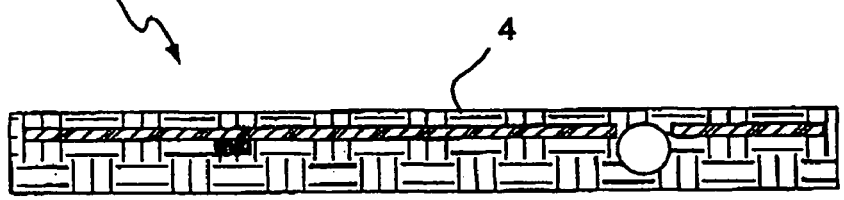
FIG. 2 shows a longitudinal view along the line II-II in FIG. 1.

The balis-plate shown in FIGS. 1 and 2 and generally designated 1 is made from an SMC-material and is incorporated as a part in a so called ATC-system (Automatic Traffic Control) that is used for the automatic supervision of trains. The said balis-plates lie attached to sleepers between the rails that form the rail track, ad their task is to register and transfer information about passing trains to and from the computer units with which the locomotives are equipped. With the help of this information, the computer unit of the locomotive can, among other things, calculate its location on the track and confirm the whereabouts of other trains. The information transfer from the balis to the locomotive or vice-versa takes place in a wireless manner, whereby the balis is equipped with a means of transmission, including an electronic circuit that via a first 2 and a second connection point 3 is in electronic communication with an antenna loop 5 arranged on a circuit board 4, where this is embedded in the moulding material that forms the structure or body of the balls. The balis has a predetermined or expected operational life span and it should be realised that the ability to prevent moisture and fluids from forcing their way into the sensitive antenna loop 5 is critical if this set life span is to be achieved. At the same time as the balis-plate 1 is at the mercy of the elements through its location between the rails, i.e. it is very exposed indeed, very great demands are made on its reliability and function since the balis-plate is part of a safety system. Not the least, it should be realised that the effective embedding of the antenna loop in the moulding material contributes to raising the operational reliability since fluids and moisture are prevented from coming in contact with the said antenna loop.

With reference to FIGS. 4-9, a moulding tool intended for manufacturing the balis-plate 1 as shown in FIG. 1 with the loop-shaped circuit board 4 embedded in it is shown. The moulding tool includes two joinable mould halves comprising an upper mould half 6 and a lower mould half 7 that in a known manner can be assembled in a releasable manner at the upper displaceable 8 and lower fixed 9 parts of a pressing table indicated by a dashed/dotted line and included in a figure but not illustrated further. In each case, the two joinable mould halves have a moulding face or a working surface 10 respective 11 that, when the mould halves are joined together, demarcate an inner cavity that is equivalent to the outer shape of the balis-plate 1. The cavity formed by the said mould halves 6, 7 is preferably of the so-called sealing type and designed in the known manner so that when the halves are clamped together, only a small amount of moulding material is pressed out through the gap that is demarcated between the parting line of the mould halves.

The moulding device also has an associated control and guidance device, not shown in the figures, for example, a programmable computer or similar, with whose help all the parameters necessary for performing the compression moulding operation, including amongst others the sealing speed of the moulding halves, the temperature, the different directions and cycle times of the process, plus associated equipment such as the driving cylinders, etc., can be controlled and guided.

The upper respective lower mould halves 6, 7 each include a set of the support devices 12 that, when acted on by an adjusting and manoeuvring device 13, are displaceable in a projecting manner relative to the moulding face 10 respective 11 to, in their forwardly projecting position, be able to grasp hold between themselves of the insert part that, in the form of a circuit board 4, is to be accommodated in the product made from the SMC-material. To be able to grasp hold of the circuit board 4, the support device 12 at each of the said mould halves 6, 7 includes a set of support pins 14 where each of the ends that faces in towards the cavity is directed at one another, and where the support pins are able to run freely into and out of the cavity by being accommodated in a sliding manner in holes 15 arranged in the mould halves. In general, it can be said that the number of support pins 14, their configuration, and their position relative to one another is chosen on the basis of the contour and shape of the insert part that the projecting support pins are to grasp between themselves. The configuration of the product otherwise, such as its degree of resistance, etc., naturally also makes demands on the design of the support pins 14. In this description of one example of an embodiment, the support pins 14 are configured so that they exactly follow the loop-shaped and essentially plane outer contour of the circuit board 4.

At their ends that face away from the cavity, everyone one of the said sets of mutually facing support pins 14 is joined to the unit by a respective element 16 in the form of a slab that is located within a space that is limited by the associated mould half 6, 7 and an attachment device 17 for attaching the mould halves 6, 7 to the pressing table 8, 9. Axles 18, on which the slab 16 is displaceable in a guided vertical direction within the said cavity, extend between the said respective mould halves 6, 7 and the associated attachment device 17 for the releasable attachment at the pressing table 8, 9. The adjusting and manoeuvring device 13 named above controlled by the computer-controlled control and guidance device named above is used to manoeuvre the slab 16 and thereby also to execute the movement of the support pins 14 relative to the moulding face 10, 11 associated with each mould half 6, 7. The adjusting and manoeuvring device 13 is designed so that the support pins 14 can be manoeuvred freely into and out of the cavity and be pressed with a chosen constant pressure against the circuit board 4 accommodated between the mutually facing support pins 14 independently of the location of the mould halves 6, 7 relative to one another. The adjusting and manoeuvring device 13 with the properties named above is already well-known and will not be described in more detail in the following, but it does suitably include some type of pneumatic or hydraulically acting piston-cylinder device with an associated system of flow pathways and components. The adjusting and manoeuvring device 13 can preferably include a set of hydraulic cylinders 19 whose respective ends are joined with the slab 16 respectively the attachment device 17 and that, in order to be adjustable with a variable force, are, in a known manner, connected to a hydraulic circuit that includes among other things some type of pressure-controlling valve device in the form of, for example, a so-called flow regulator or similar. In what is a per se well-known manner, a set of ejection pins 20 whose task is to eject the finished product is arranged at the lower mould half. Since the said ejection pins 20 are already well-known, their function or construction design will not be described in detail, but it is appropriate that the ejection pins 20 and support pins 14 in the lower mould half are arranged for simultaneous manoeuvring and common ejection of the finished product.

Figure 3:
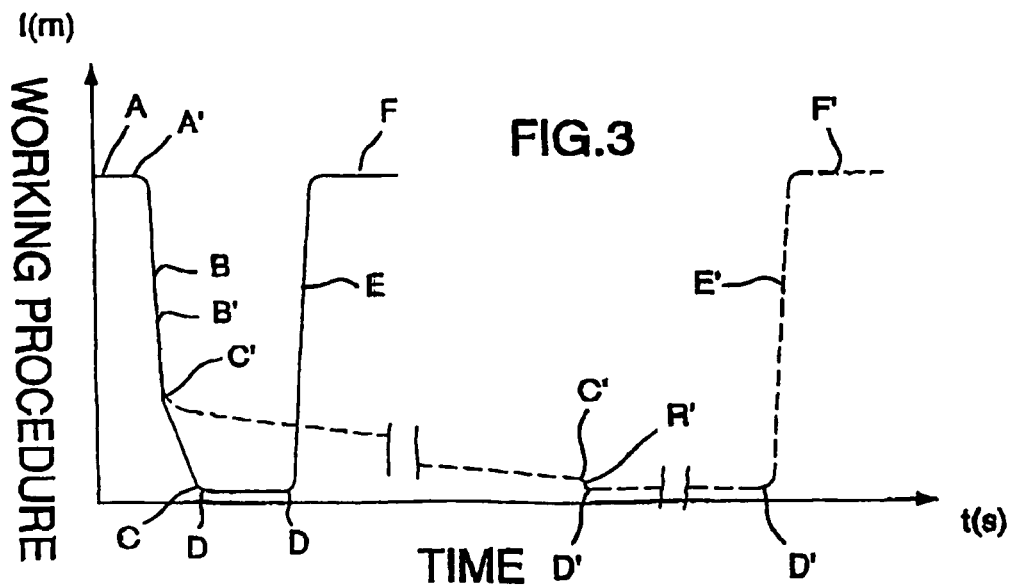
FIG. 3 shows in the form of curves a diagram of the time and working procedures when compression moulding an SMC-material in a conventional hydraulic moulding device as well as the cycle of operations when manufacturing an equivalent product of SMC-material with an insert part incorporated in and enclosed by this according to the principles for this invention.

With reference to FIG. 3, the continuous line in the diagram shows a curve of time and working procedures during a typical cycle of operations when compression moulding a SMC-material in a conventional hydraulic moulding device. The dotted/dashed line in the same diagram shows a typical curve of time and cycle of operations when manufacturing an equivalent product of SMC-material with an insert part incorporated in and enclosed by this according to the principles for this invention.

With reference to the continuous lines, the operational steps begin with an SMC-material 21 being loaded into the mould; A, where after the mould is closed; B and the material is brought to flow until the mould is completely filled and under pressure; C, the material 21 undergoes thermosetting; D, where after the mould is opened; E and the product formed from the SMC-material is removed; F.

In accordance with the principles of this present invention, the dashed line in FIG. 3 shows the time and working characteristics for a cycle of operations for manufacturing products from SMC-material with an insert part integrated in the moulding material. The different operational steps for manufacturing the balis-plate 1 exemplified here with a circuit board 4 integrated in the moulding material are described below with reference to the dashed line in the diagram plus the series of drawings in FIGS. 4-9.

Figure 4:
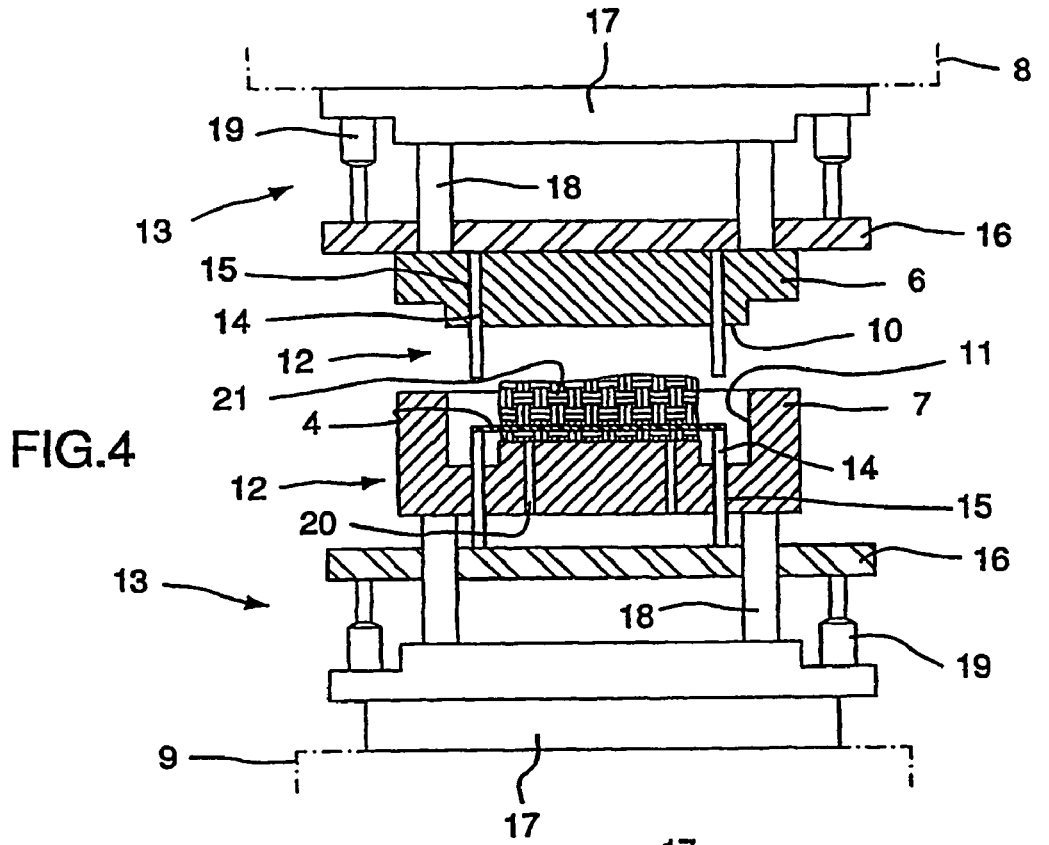
Figure 5:
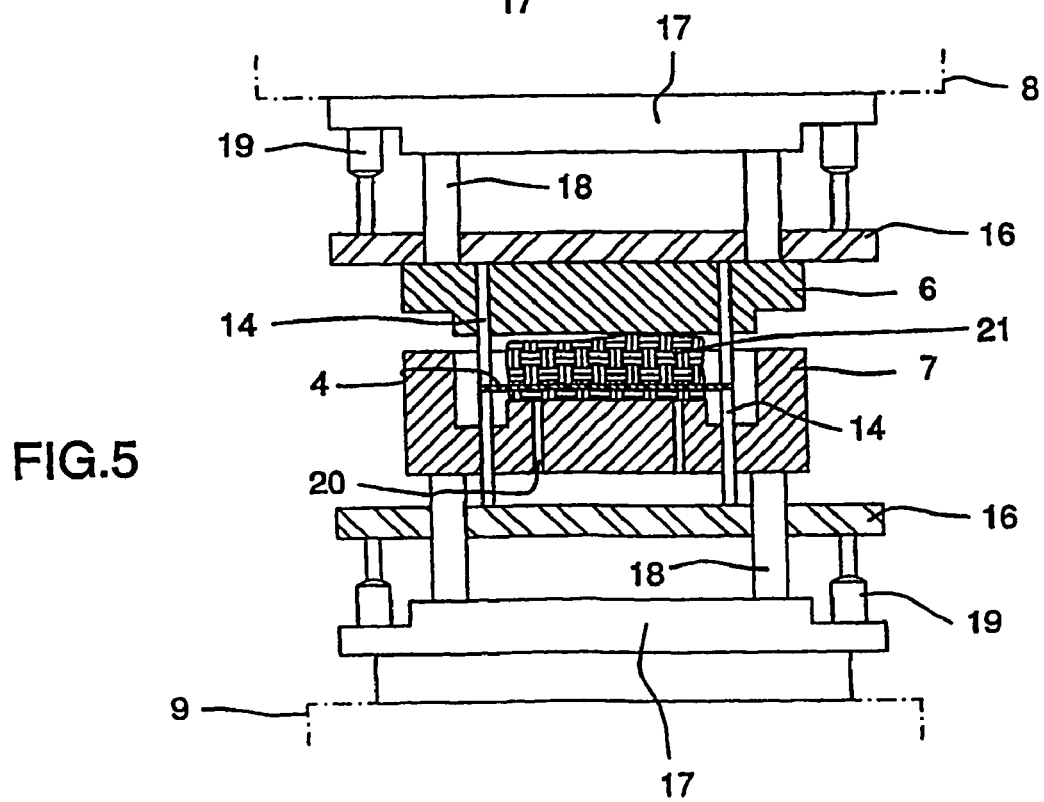

As is shown in FIG. 4, with the upper 6 and lower 7 mould halves located in their open position and the said set of support pins 14 located in their projecting position relative to the moulding faces 10 respectively 11 of the form halves, the circuit board 4 is placed in a resting position on the free ends of the support pins 14 in the lower mould half and a specified amount of SMC-material 21 is loaded into the mould; A'. As is normal when determining the amount of SMC-material required for compression moulding in so-called positive moulds, the amount loaded has been given a certain excess volume and in addition has been given an excess equivalent to the volume for both sets of support pins 14 when they project into the sealed mould in their extended positions. In FIG. 5 and step B, the mould is sealed, whereby the circuit board 4 is fixed in position with a constant, predetermined clamping force between both sets of support pins 14. Following this, the SMC-material is brought to flow until the cavity is completely filled, C'. To facilitate the flow-out and to thereby avoid the risk that the circuit board 4 fixed in position between the support pins 14 be deformed, the speed of sealing of the mould and thereby the filling out phase are significantly longer then the speeds normally applicable for compression moulding of SMC-material without insert parts. An appropriate speed for the current example is about 1 mm/second or less than this said speed, which, in this example, would mean that the filling phase is at least 20-30 times longer than normal. This should be realised by comparing both lines C respectively C'-C' in the diagram, and in this respect lies the difficulty of giving the moulding material such a mix and properties that it does not set during the relatively long closing and sealing times of the mould.

In the embodiment described here, the closing times are about 1 minute, which contrasts with the closing times that normally apply when manufacturing equivalent items without an insert part when the closing times normally hardly reach 2-3 seconds. In this respect, the flowability of the SMC-material has been significantly reduced in relation to the degree of flowability that normally applies when manufacturing equivalent items without an insert part, but the SMC-material does not become unmanageable because of this. In addition, the addition of so-called inhibitors, i.e. substances that delay the chemical reaction, also ensures that the SMC-material does not set during the sealing of the mould. During the manufacture of a balis-plate 1 with a shape equivalent to the embodiment described, SMC-material 21 having a degree of flowability in the range $1\cdot 10^6$-$30\cdot 10^6$ mPas (millipascals per second, according to the Brookfield Viscosity meter with a spindle T-F/1 rpm) has been shown to give a very good result A degree of flowability around $5\cdot 10^6$ mPas has been shown to be preferable.

As the support pins 14 occupy a part of the total volume in the cavity demarcated between the mould halves 6, 7, the closing process of the compression moulding operation according to the invention, with regard to the working motion, is ended somewhat earlier than normally would be the case with the compression moulding of SMC-material. This should be clearly evident from a comparison of the dashed line and the continuous line in the diagram at the points C' respective C. In this respect, the mould halves 6, 7 have been given a vertical parting line with narrow tolerances so that an effective sealing between the interacting parts can be obtained at the closing of the mould halves, despite the low degrees of flowability chosen for the moulding material in this case. It should be pointed out that the low degrees of flowability for the SMC-material 21, in combination with the narrow tolerances and low degree of play of the parting line or the compression edges, place high demands on the guiding of the mould halves 6, 7 relative to one another. In the present embodiment, with its selected degrees of flowability, it has been shown to be appropriate to use mould halves whose compression edges have a gap with a play in the order of 0.05-0.08 mm when the tool is closed.

Figure 6:
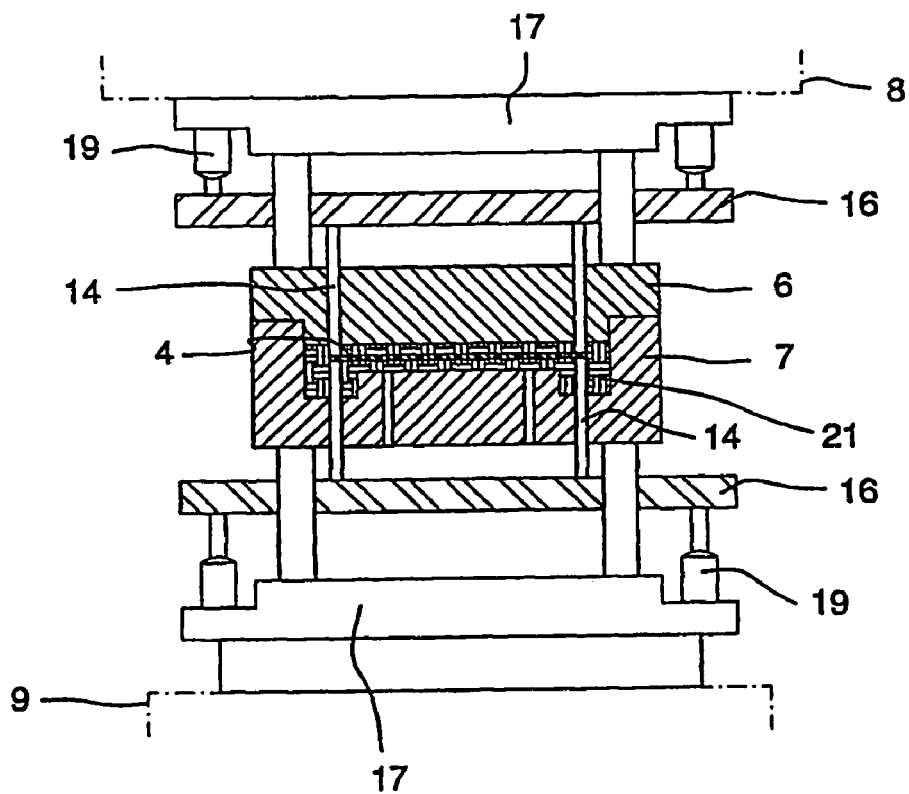
Figure 7:
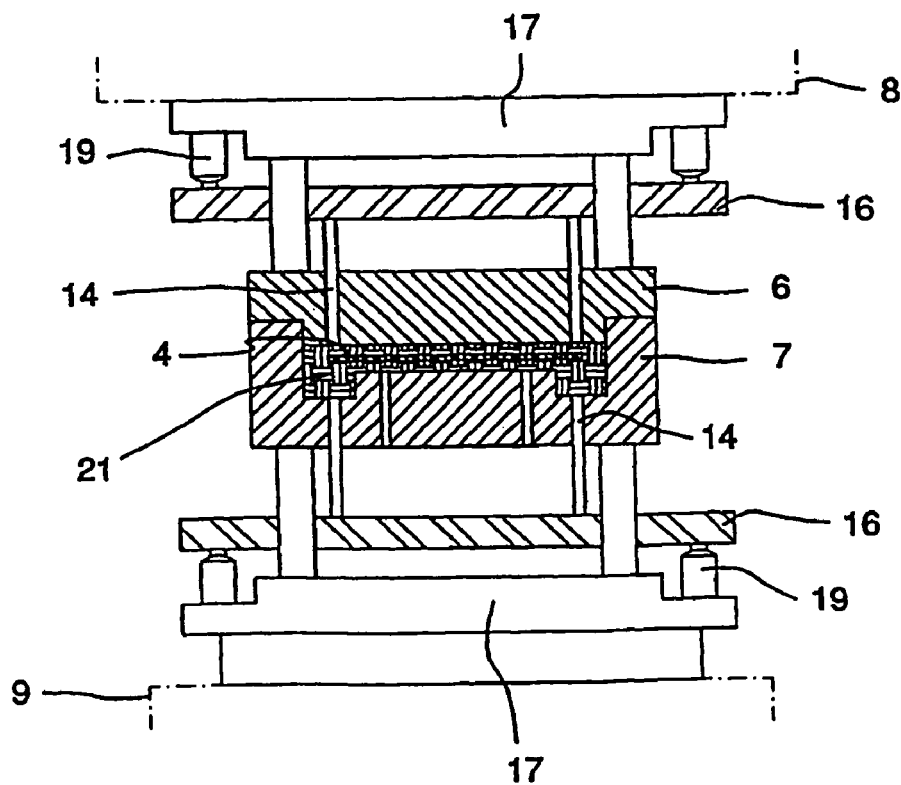

With reference to FIG. 3 and FIGS. 6 and 7, the SMC-material is pressed together and brought to flow and fill out the mould; C', whereby, before the material sets, the support pins 14 are manoeuvred out from the cavity and thereby away from their location grasping the circuit board 4 (FIG. 7), after which the mould halves 6, 7 are further pressed together somewhat during the filling out of the holes left after the support pins 14; R'. Finally, the material undergoes setting during a specified interval of time D'-D'.

It can be pointed out that even if the interval of time chosen is guided by a series of design factors such as the thickness of the goods and the shape of the product the chosen setting time is significantly longer than what is normally used and in this described embodiment is up to 12 minutes. The said relatively long setting time is symbolised by the broken line between the points D'-D' in the diagram. In the final phase of the moulding and in the compression phase, no material in principle passes out through the compression edges of the mould halves 6, 7.

When the SMC-material has undergone the setting required, the mould halves 6, 7 are opened; E' (FIG. 8), after which the finished product or, more specifically the balis-plate 1, is ejected by means of the ejection pins 20 and removed from the mould; F' (FIG. 9).

The present invention is not limited to that described above and shown in the drawings, but can be changed and modified in a number of ways within the scope of the concept of the invention as specified in the following claims.

The invention claimed is:

1. A method for encapsulating an insert part comprised of a fibre-reinforced circuit board having circuit components mounted thereon by compression moulding a heat-bonding thermosetting resin about the insert part between two joinable halves of a separable mould, said mould having an upper mould half and a lower mould half forming a cavity therebetween when the mould is closed, inner moulding faces attached to displaceable respective fixed parts of a pressing table, wherein, the mould halves each have a set of a support devices displaceable in the cavity relative to the respective moulding faces comprising the steps of:

selecting the heat-bonding thermosetting resin having a viscosity chosen in the range of about $1$-$10^6$ to about $30$-$10^6$ mPas;

positioning the support devices in the mould for supporting the insert part in a fixed position relative to the mould faces;

positioning the insert part on the support devices;

thereafter loading the heat-bonding thermosetting resin in the mould;

closing the mould after the loading step and the positioning step;

pressing the mold halves together for compressing the resin to initiate curing of the resin after closing the mold;

concurrently with compressing the resin and prior to curing of the resin, removing the support device from its position supporting the insert part leaving temporary holes in the material; and thereafter continuing pressing the mould halves together to further compress the resin for filling the temporary holes left in the material after removal of the support device and to continue the curing of the resin until said resin fully cures, whereby the circuit board and electronic components thereon are surrounded by the fully cured resin without damaging the circuit board and electronic components.

2. The method according to claim 1 further including the step of giving the resin a certain excess volume equivalent to the volume of the holes left after the support device is removed.

3. The method according to claim 1 further including the step of placing the insert part in a resting position on the support device of the lower mould half located in a forward projecting position relative to the associated mould face, and during the sealing movement of the mould, the support devices of the upper mould half, after contact with the insert part, are displaced into the upper mould half during exertion of a constant force of pressure against the insert part.

4. The method according to claim 1, including selecting flexability of $1\cdot 10^6$ mPas of the thermosetting resin.

5. The method according to claim 1, including selecting a heat-bonding thermosetting resin comprising one or more inhibitors for delaying the chemical reaction during the sealing of the mould.

* * * * *